United States Patent
Lee et al.

(10) Patent No.: US 10,334,452 B2
(45) Date of Patent: Jun. 25, 2019

(54) APPARATUS AND METHOD FOR OPTIMIZING PARAMETER OF ANTENNA IN WIRELESS COMMUNICATION SYSTEM

(71) Applicant: Samsung Electronics Co., Ltd., Suwon-si, Gyeonggi-do (KR)

(72) Inventors: Hyon-Seung Lee, Seoul (KR); Byoung-Ha Yi, Seoul (KR); Han-Seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 14/864,063

(22) Filed: Sep. 24, 2015

(65) Prior Publication Data

US 2016/0135062 A1    May 12, 2016

(30) Foreign Application Priority Data

Nov. 7, 2014 (KR) .................. 10-2014-0154493

(51) Int. Cl.
*H04W 24/02* (2009.01)
*H04W 24/10* (2009.01)
*H04W 76/27* (2018.01)
*H04W 72/04* (2009.01)
*H04L 5/00* (2006.01)
*H04W 28/18* (2009.01)
*H04W 76/10* (2018.01)

(52) U.S. Cl.
CPC .......... *H04W 24/02* (2013.01); *H04W 24/10* (2013.01); *H04W 72/046* (2013.01); *H04W 76/27* (2018.02); *H04L 5/0048* (2013.01); *H04W 28/18* (2013.01); *H04W 76/10* (2018.02)

(58) Field of Classification Search
CPC ............. H04L 41/0823; H04L 41/0886; H04L 5/0048; H04W 24/02; H04W 72/085; H04W 84/18; H04W 76/27; H04W 72/046; H04W 24/10; H04W 76/10; H04W 28/18
USPC ................................... 370/252, 254
See application file for complete search history.

(56) References Cited

U.S. PATENT DOCUMENTS

| | | |
|---|---|---|
| 7,295,960 B2 | 11/2007 | Rappaport et al. |
| 7,539,489 B1 | 5/2009 | Alexander |
| 7,903,613 B2 | 3/2011 | Ozluturk et al. |
| 8,301,149 B2 | 10/2012 | Del Rio Romero et al. |
| 8,379,574 B2 | 2/2013 | Hilborn |
| 8,405,547 B2 | 3/2013 | Gianinni et al. |
| 2005/0073970 A1 | 4/2005 | Davidson et al. |

(Continued)

FOREIGN PATENT DOCUMENTS

WO    2010/051838 A1    5/2010

*Primary Examiner* — Will W Lin
(74) *Attorney, Agent, or Firm* — Jefferson IP Law, LLP

(57) ABSTRACT

An apparatus and a method for optimizing a parameter of an antenna based on radio frequency (RF) environment information in a wireless communication system are provided. The electronic device includes a reception unit configured to receive first network information and second network information, and a transmission unit configured to transmit a first signal to adjust a parameter of an antenna when a difference between a first indicator value included in the first network information and a second indicator value included in the second network information is greater than or equal to a first threshold.

17 Claims, 8 Drawing Sheets

(56) References Cited

U.S. PATENT DOCUMENTS

| | | | |
|---|---|---|---|
| 2011/0143746 A1* | 6/2011 | Lehser | H04W 24/02 |
| | | | 455/423 |
| 2011/0212720 A1 | 9/2011 | Hamalainen et al. | |
| 2012/0004001 A1* | 1/2012 | Power | H04W 24/02 |
| | | | 455/507 |
| 2012/0196611 A1* | 8/2012 | Venkatraman | H04W 52/143 |
| | | | 455/450 |
| 2013/0090128 A1* | 4/2013 | Sawamoto | H04W 24/02 |
| | | | 455/452.2 |
| 2013/0279357 A1* | 10/2013 | Gao | H04W 24/10 |
| | | | 370/252 |
| 2014/0194113 A1* | 7/2014 | Ahlstrom | H04W 24/08 |
| | | | 455/423 |
| 2015/0055503 A1* | 2/2015 | Xia | H04L 5/005 |
| | | | 370/252 |
| 2016/0165472 A1* | 6/2016 | Gopalakrishnan | H04W 24/10 |
| | | | 455/67.11 |
| 2016/0183143 A1* | 6/2016 | Park | H04W 36/16 |
| | | | 455/436 |
| 2016/0302117 A1* | 10/2016 | Inoue | H04W 36/0088 |
| 2016/0359593 A1* | 12/2016 | Dai | H04L 27/0006 |
| 2017/0026100 A1* | 1/2017 | Wang | H04W 72/12 |
| 2017/0078903 A1* | 3/2017 | Kusashima | H04W 24/10 |
| 2017/0111764 A1* | 4/2017 | Chou | H04L 12/6418 |
| 2017/0150387 A1* | 5/2017 | Fujishiro | H04W 16/14 |

* cited by examiner

APPARATUS AND METHOD FOR OPTIMIZING PARAMETER OF ANTENNA IN WIRELESS COMMUNICATION SYSTEM

CROSS-REFERENCE TO RELATED APPLICATION(S)

This application claims the benefit under 35 U.S.C. § 119(a) of a Korean patent application filed on Nov. 7, 2014 in the Korean Intellectual Property Office and assigned Serial number 10-2014-0154493, the entire disclosure of which is hereby incorporated by reference.

TECHNICAL FIELD

The present disclosure relates to an apparatus and a method for optimizing a parameter of an antenna in a wireless communication system.

BACKGROUND

It may be necessary to optimize a communication network, in which a base station and a user equipment (UE) are included, so that the base station may more efficiently communicate with the UE in a wireless communication system. Thus, a technology for optimizing a communication network may be considered as being essential in a wireless communication field.

The communication network optimization technology of the related art does not optimize, in real time, a communication network being currently operating but is characterized by optimizing the communication network by using separate test equipment. In other words, by using separate human resources and measurement equipment, a service provider, that operates a particular communication network, may measure the state of a current communication network according to a predetermined scenario, and may optimize the current communication network according to the scenario.

For example, the service provider may set up a scenario in which the service provider sets up a movement path of a test UE along an optional path included in a particular cell and then allows the test UE to move according to the predetermined movement path. When the test UE moves according to the scenario, the service provider may measure the state of the communication network according to the movement path, and may optimize the current communication network according to a result of the measurement.

However, the communication network optimization technology needs separate human resources and devices, and thus is problematic in that the communication network optimization technology consumes separate costs for optimizing a communication network. Also, the communication network optimization technology is problematic in that the optimization of a communication network in an entire area where a wireless communication service is provided is not achieved but the optimization of a communication network, which is limited to a particular test scenario, is only achieved. Thus, there arises the necessity of a communication network optimization technology for solving the above-mentioned problems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for optimizing a parameter of an antenna in a wireless communication system.

Another aspect of the present disclosure is to provide an apparatus and a method for optimizing a parameter of an antenna based on radio frequency (RF) environment information in a wireless communication system.

Another aspect of the present disclosure is to provide an apparatus and a method for optimizing a parameter of an antenna based on user equipment-based network information in a wireless communication system.

Another aspect of the present disclosure is to provide an apparatus and a method for optimizing a parameter of an antenna based on base station-based network information in a wireless communication system.

In accordance with an aspect of the present disclosure, an electronic device in a wireless communication system is provided. The electronic device includes a reception unit configured to receive first network information and second network information, and a transmission unit configured to transmit a first signal to adjust a parameter of an antenna when a difference between a first indicator value included in the first network information and a second indicator value included in the second network information is greater than or equal to a first threshold.

In accordance with another aspect of the present disclosure, a base station in a wireless communication system is provided. The base station includes a transmission/reception unit configured to transmit first network information and second network information, and to receive a first signal to adjust a parameter of an antenna of the base station when a difference between a first indicator value included in the first network information and a second indicator value included in the second network information is greater than or equal to a first threshold.

In accordance with another aspect of the present disclosure, an operating method of an electronic device in a wireless communication system is provided. The operating method includes receiving first network information and second network information, determining whether a difference between a first indicator value included in the first network information and a second indicator value included in the second network information is greater than or equal to a first threshold, and transmitting a first signal to adjust a parameter of an antenna when the difference is greater than or equal to the first threshold.

In accordance with another aspect of the present disclosure, an operating method of a base station in a wireless communication system is provided. The operating method includes transmitting first network information and second network information, and receiving a first signal to adjust a parameter of an antenna of the base station when a difference between a first indicator value included in the first network information and a second indicator value included in the second network information is greater than or equal to a first threshold.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

The following description will be made of an apparatus and a method for optimizing a parameter of an antenna based on radio frequency (RF) environment information in a wireless communication system.

A term related to RF environment information, a term related to a parameter of an antenna, a term related to a connection between a base station and a user equipment (UE), and the like, which are used in the following description, are for convenience of description. Thus, various embodiments of the present disclosure are not limited to the terms set forth below, and another term referring to a subject having an equivalent technical meaning may be used.

A wireless communication system according to an embodiment of the present disclosure may include a long term evolution (LTE) wireless communication system which includes a base station device and a UE device. The base station device may include an evolved node B (eNB), and the UE device may include a UE.

Figure 1:
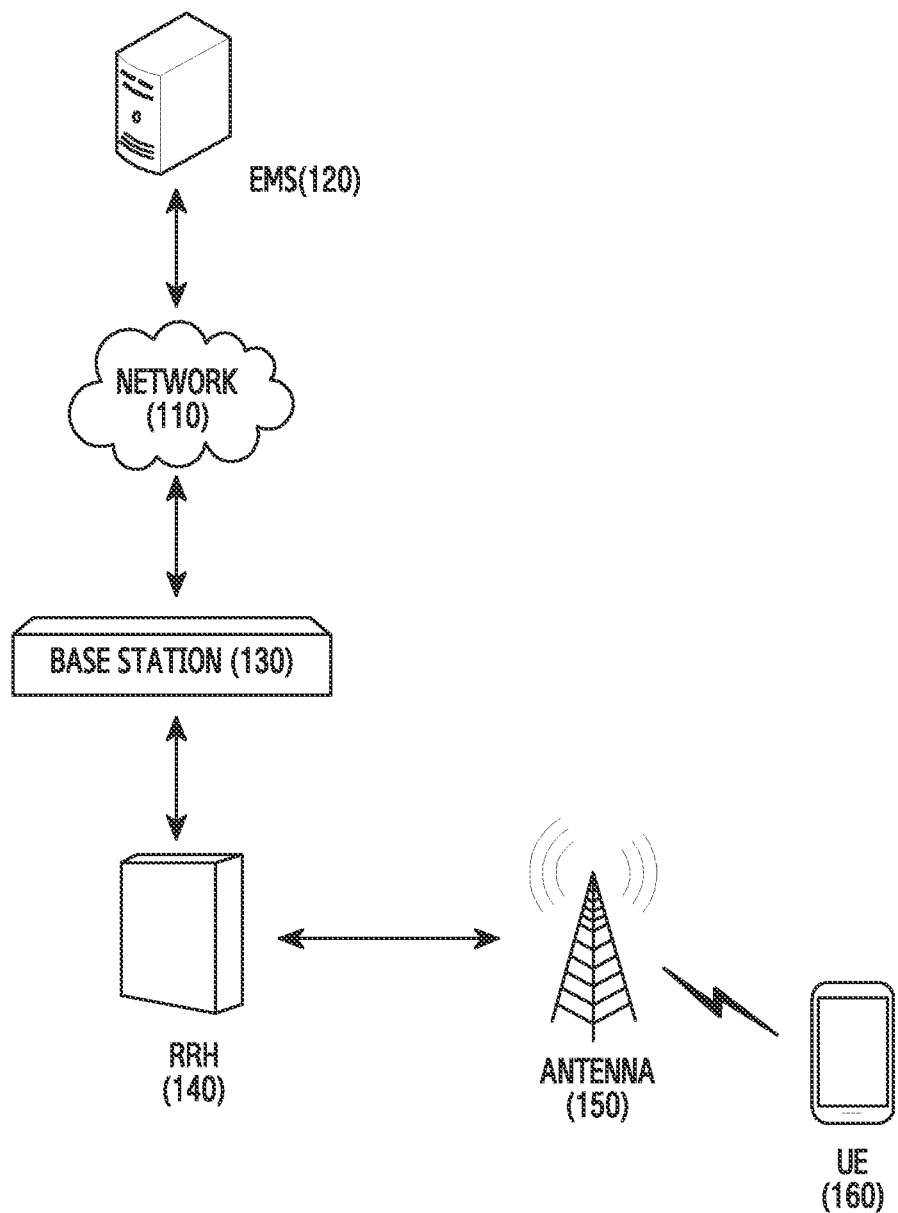
FIG. 1 illustrates a configuration of a network in a wireless communication system according to an embodiment of the present disclosure.

FIG. 1 illustrates a configuration of a network in a wireless communication system according to an embodiment of the present disclosure.

Referring to FIG. 1, an element management system (EMS) 120 and a base station 130 may be connected to a network 110. Also, a remote radio head (RRH) 140 and an antenna 150 may be combined with the base station 130, or may be included in the base station 130. Further, a UE 160 may be connected to the base station 130, and as a result, may be connected to the network 110 through the base station 130.

The network 110 refers to a combination of electrical communication devices, electrical communication apparatuses, and transmission lines which enable geographically-separated apparatuses to access each other and to exchange information with each other. Also, the EMS 120 capable of being connected to the network 110 may be referred to as an "EMS server," an "element management server," and the like, and typically serves to control and manage multiple base stations.

The base station 130 is a device that controls a particular cell, and may serve as an intermediary between a UE and an exchange office which are included in the particular cell controlled by the base station 130. For example, in the case of an LTE wireless communication system, the base station 130 may include an eNB. Particularly, in the LTE wireless communication system, the eNB may include an RF unit (RU) and a digital unit (DU). In this case, the RU may process an RF signal. Also, only the RU may be separated from the base station 130, and the separated unit may be referred to as a "remote radio unit (RRU)" or an "RRH." Further, one base station may include multiple RRHs or multiple RRUs, and the multiple RRHs or the multiple RRUs may be installed so as to be physically distributed. In addition, the DU is a unit that processes a digital signal, and may be referred to as a "base band unit (BBU)."

The RRH 140 capable of being combined with the base station 130 refers to a unit capable of processing an RF signal in the LTE wireless communication system, as described above. Also, the antenna 150 is a unit that efficiently transmits/receives a radio signal through space in order to achieve the purpose of communication in wireless communication, and may be combined with the base station 130, or may be included in the base station 130. Further, the antenna may include an omni-directional antenna, a directional antenna, and/or the like.

In addition, the UE 160 refers to an apparatus that is connected to a communication network in order to transmit/receive data or a message. Particularly, in the wireless communication system, the UE 160 may be connected to the base station 130, and as a result, may be connected to the network 110 through the base station 130.

Figure 2:
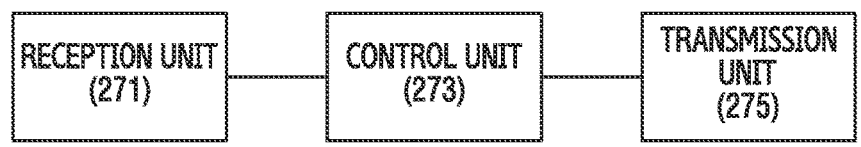
FIG. 2 illustrates a block configuration of an electronic device in a wireless communication system according to an embodiment of the present disclosure.

FIG. 2 illustrates a block configuration of an electronic device in a wireless communication system according to an embodiment of the present disclosure.

Referring to FIG. 2, the electronic device according to an embodiment of the present disclosure includes a reception unit 271 configured to receive first network information and second network information, and a transmission unit 275 configured to transmit a first signal to adjust a parameter of an antenna when a difference between a first indicator value included in the first network information and a second indicator value included in the second network information is greater than or equal to a first threshold.

The electronic device according to an embodiment of the present disclosure may be connected to a network of the wireless communication system, and may serve to control a base station connected to the network.

The electronic device may include the reception unit 271 that receives network information from the base station. In this case, the network information may be set to be periodically received from the base station.

The network information may include UE-based network environment information and base station-based network environment information. At this time, the UE-based network environment information signifies network environment information that the UE reports to the base station, and may include, for example, information included in a measurement report, uplink sounding reference signal (SRS) power information, and the like.

Typically, the UE that accesses the base station serves to report current RF environment information to the base station, which is referred to as a "measurement report." At this time, the base station may set the UE to periodically perform the measurement report. Alternatively, the base station may set the UE to perform the measurement report only when a particular event (e.g., a handover) occurs.

For example, the measurement report may include RF environment information, such as reference signal received power (RSRP) or reference signal received quality (RSRQ) of a serving base station or a neighboring base station. The RSRP represents a power value of an RS received from the base station with the UE as a reference. At this time, it may be determined that a current RF environment for wireless communication between the base station and the UE is relatively good as the RSRP has a larger value.

Also, the RSRQ signifies the ratio of power of all signals received from the base station to power of an RS, with the UE as a reference. The RSRP includes only information on an RS, and is disadvantageous in that the RSRP is not capable of reflecting the remaining environment information except for an RS, such as an interference signal or a thermal noise due to an adjacent channel. Thus, the RSRQ may compensate for the above-described problems of the RSRP. As a result, the RSRQ may be noted as an indicator which more faithfully reflects an actual wireless communication environment than the RSRP.

As described above, the UE may transmit, to the base station, the measurement report including the RF environment information, such as RSRP, RSRQ, and the like. Thus, the base station may collect the actual RF environment information within a cell currently provided with a wireless communication service on the basis of the received measurement report. Also, the base station may statistically process the information collected through the measurement report, and may utilize the statistically-processed information as criteria data for determining whether an RF environment change subsequently occurs.

As described above, the UE-based network environment information may include uplink SRS power information. An uplink SRS refers to a signal that the base station uses to perform channel estimation for scheduling and link adaptation according to an uplink channel, and may be transmitted from the UE to the base station in uplink. Also, the UE may transmit the SRS power value to a serving base station or a neighboring base station at a particular point within a cell currently provided with a wireless communication service. In response, the serving base station or the neighboring base station may receive the SRS power value, and thereby may collect, in real time, the actual RF environment information within the cell currently provided with the wireless communication service.

The network information may include base station-based network environment information. The base station-based network environment information signifies information that the base station finally collects on the basis of base station-related operation information of the UE. The base station-based network environment information may include, for example, radio resource control (RRC) connection-related information, call drop-related information, information on a relation between cells, and the like.

The information on the relation between cells includes information on a relation between a serving base station, that currently provides a communication service, and a neighboring base station, with a particular UE as a reference. Also, the information on the relation between cells includes information on a relation between a base station, which is located relatively near the particular UE with the particular UE as the reference and has a high possibility of currently affecting communication performed by the particular UE, and a base station which is located relatively far away from the particular UE with the particular UE as the reference and has a low possibility of currently affecting the communication performed by the particular UE.

Further, the information on the relation between cells includes information on a relation between a base station, which is located relatively near the particular UE with the particular UE as the reference and has a high possibility that the particular UE is handed over, and a base station which is located relatively far away from the particular UE with the particular UE as the reference and has a low possibility that the particular UE is handed over. As a result, the base station may acquire relative relation information between the particular UE and multiple base stations, and thereby may collect, in real time, the actual RF environment information within a cell currently provided with a wireless communication service. Then, the base station may statistically process the collected information, and may utilize the statistically-processed information as criteria data for determining whether an RF environment change subsequently occurs.

In addition, in relation to the RRC connection, in, for example, the LTE wireless communication system, the UE communicates with the base station through an RRC protocol. Specifically, in order to communicate with the base station, the UE transmits an RRC connection request message to the base station, the base station transmits an RRC connection setup message for resource allocation to the UE in response to the RRC connection request message, and the UE sets up a connection with the base station on the basis of the allocated resources.

As described above, in relation to the RRC connection with the base station by the UE, the base station may identify the RRC connection request message, and thereby may collect information on how many connection attempts are currently made by UEs in the wireless communication system, in addition to information on how many UEs currently succeed in making the connections among the multiple UEs attempting the connections in the wireless communication system. Also, based on RRC connection information and call drop-related information described below, the base station may collect information on how many UEs there are which have terminated the connections thereof and attempt reconnections among the UEs previously connected to the base station, in addition to information on how many UEs succeed in making the connections among the multiple UEs attempting the reconnections. As a result, the base station may acquire the pieces of information related to the RRC connections of the UEs, and thereby may collect, in real time, the actual RF environment information within a cell currently provided with a wireless communication service. Then, the base station may statistically process the collected information, and may utilize the statistically-processed information as criteria data for determining whether an RF environment change subsequently occurs.

Also, the call drop signifies a phenomenon in which a telephone call is terminated due to the failure of a wireless section before a mobile communication subscriber completes the telephone call. In this regard, the base station may collect information on the number of UEs in which call drops occur among multiple UEs currently being connected to the base station, and thereby may collect, in real time, the actual RF environment information within a cell currently provided with a wireless communication service. Then, the base station may statistically process the collected information, and may utilize the statistically-processed information as criteria data for determining whether an RF environment change subsequently occurs.

When a difference between the first indicator value included in the first network information and the second indicator value included in the second network information is greater than or equal to the first threshold, the electronic device includes the transmission unit 275 configured to transmit a first signal to adjust a parameter of an antenna. In this case, the first network information may be received after a certain cycle from a time point of receiving the second network information.

For example, the transmission unit 275 of the electronic device may transmit, to the base station, a signal for adjusting a parameter of a base station antenna, when a difference between the first indicator value, which is included in the first network information received from the base station via the reception unit 271, and a second indicator value, which is included in second network information received from the base station, is greater than or equal to a threshold.

Also, the electronic device may include a control unit 273. The control unit 273 compares the first indicator value, which is included in the first network information received by the reception unit 271, with the second indicator value included in the second network information previously received from the base station. As described above, each of the first network information and the second network information may include UE-based network environment information and base station-based network environment information. In this case, the UE-based network environment information may include, for example, information such as RSRP or RSRQ of a serving base station or a neighboring base station which is included in a measurement report, uplink SRS power information, and the like. The base station-based network environment information may include, for example, RRC connection-related information, call drop-related information, information on a relation between cells, and the like.

The first indicator value included in the first network information may be a particular value indicating at least one piece of network environment information included in the multiple pieces of network environment information described above as an example. For example, the first indicator value may be determined as at least one value from among an RSRP value, an RSRQ value, an uplink SRS power value, the number of UEs currently being connected to a base station, and the number of UEs in which call drops occur, which are based on the actual RF environment information within a cell currently provided with a wireless communication service.

Also, the network information may be set to be periodically received from the base station. Thus, second network information may also separately exist which is received from the base station at a time point (hereinafter referred to as a "previous time point") preceding a time point of determining the first indicator value by a time period corresponding to a particular predetermined cycle. In this case, as described above, the second network information may include UE-based network environment information and base station-based network environment information. The UE-based network environment information may include information such as RSRP or RSRQ of a serving base station or a neighboring base station which is included in a measurement report, uplink SRS power information, and the like. The base station-based network environment information may include RRC connection-related information, call drop-related information, information on a relation between cells, and the like.

The second indicator value included in the second network information may be a particular value indicating at least one piece of network environment information included in the multiple pieces of second network environment information described above as an example. For example, the second indicator value may be determined as at least one value from among an RSRP value, an RSRQ value, an uplink SRS power value, the number of UEs currently being connected to a base station, and the number of UEs in which call drops occur, which are set at the previous time point.

The control unit 273 compares the first indicator value with the second indicator value. Specifically, the control unit 273 determines whether a difference between the first indicator value and the second indicator value is greater than or equal to a predetermined first threshold. For example, the first indicator value may be determined as an RSRP value that the base station statistically processes at a current time point, and the second indicator value may be determined as an RSRP value that the base station has statistically processed at the previous time point. In this case, the control unit 273 determines whether a difference between the RSRP value at the current time point and the RSRP value at the previous time point is greater than or equal to the first threshold.

When it is determined that the difference between the first indicator value and the second indicator value is greater than or equal to the predetermined first threshold, the control unit 273 determines that an environment of a wireless communication network is currently degraded enough to need to be adjusted. In other words, when the control unit 273 determines that the difference between the first indicator value and the second indicator value is greater than or equal to the predetermined first threshold, it may be determined that a new out-of-service-area is generated within the coverage of a particular base station, or an excessive number of UEs are connected to the particular base station within the coverage of the particular base station due to a problem occurring in a neighboring base station. As a result, a parameter of the antenna may be adjusted by the control unit 273, and thereby the coverage of the particular base station may be changed.

For example, when consideration is given to a case where the boundary of the coverage of the particular base station is adjacent to the boundary of a river and a UE does not exist on the surface of the river, the second indicator value indicating network environment information within the coverage may be determined as an RSRP value that the particular base station has statistically processed at the previous time point, and a relative value of the RSRP may be determined as 100.

When consideration is given to a case where a new bridge is constructed over the river, new movement of a UE occurs through the new bridge, and UEs on the bridge deviate from the existing coverage. Thus, the first indicator value may be determined as an RSRP value that the particular base station statistically processes at a current time point, and a relative value of the RSRP may be determined as 40. In this case, it is obvious that the RSRP value at the current time point becomes less than the RSRP value at the previous time point, and a reduction in the RSRP value signifies a reduction in a received strength of the RS. Thus, it is also obvious that the environment of the wireless communication network is currently degraded.

However, a determination as to whether the environment of the wireless communication network is currently degraded enough to need to be adjusted is distinguished from a determination that the environment of the wireless communication network has been simply degraded. In other words, when the degree of degradation is quantified and the environment of the wireless communication network is degraded enough to exceed a particular level, in the embodiment of keeping the wireless communication network balanced, it is desirable to determine that the environment of the wireless communication network is currently degraded enough to need to be adjusted. At this time, the particular level is determined as the first threshold.

According to the above-described example, the second indicator value may be determined as an RSRP value that the base station has statistically processed at the previous time point, and a relative value of the RSRP may be determined as 100. The first indicator value may be determined as an RSRP value that the base station statistically processes at the current time point, and a relative value of the RSRP may be determined as 40. The threshold may be determined as a relative value of 50. In this case, a difference between the first indicator value and the second indicator value is equal to 60, and the value of the difference is greater than or equal to the certain threshold. Thus, the control unit 273 may determine that the environment of the wireless communication network has been degraded enough to exceed the particular level, and as a result, may determine that the environment of the wireless communication network has currently been degraded enough to need to be adjusted.

When it is determined that the difference between the first indicator value and the second indicator value is greater than or equal to the predetermined first threshold, the control unit 273 generates a signal for adjusting a parameter of the antenna of the base station, and transmits the generated signal to the base station via the transmission unit 275. In this case, examples of the parameter of the antenna of the base station may include at least one of a tilt of the antenna, a direction thereof, a height thereof, and a gain thereof.

For example, a tilt value of the antenna may be adjusted by the control unit 273. Specifically, the tilt value of the antenna signifies a tilt angle that the axis of a directional antenna makes with a horizontal plane. The control unit 273 transmits, to the base station, a signal for adjusting the tilt value of the antenna, and the tilt value of the antenna is adjusted through the base station. Also, the tilt value may be adjusted in a unit of particular predetermined operation.

As in the above-described example, when the construction of the new bridge causes multiple UEs to be outside the existing coverage and thus there is a reduction in the RSRP value statistically processed by the base station, the tilt value of the antenna may be adjusted to include the bridge area in the existing coverage through up-tilt.

After the parameter of the antenna is adjusted, the control unit 273 performs a validation check. In other words, the control unit 273, which determines that the environment of the wireless communication network has been degraded enough to exceed the particular level, may adjust the parameter of the antenna of the base station. A process may be performed for checking whether the environment of the wireless communication network recovers the existing level as a result of adjusting the parameter of the antenna by the control unit 273.

Specifically, after the parameter of the antenna of the base station is adjusted, when an indicator value included in third network information received from the base station is defined as a third indicator value, the control unit 273 may perform the validation check by comparing the first indicator value with the third indicator value. In other words, the control unit 273 determines whether a difference between the first indicator value and the third indicator value is greater than or equal to a predetermined second threshold. When it is determined that the value of the difference is greater than or equal to the second threshold, the control unit 273 determines that the environment of the wireless communication network is optimized. This is because, when it is determined that the value of the difference is greater than or equal to the second threshold, the parameter of the antenna of the base station is adjusted in view of the environment of the wireless communication network, which has previously been determined to be degraded, and then the environment of the wireless communication network may be regarded as being improved enough to exceed the particular level.

For example, the first indicator value may be determined as an RSRP value that the base station statistically processes at the current time point, and a relative value of the RSRP may be determined as 40. The third indicator value may be determined as an RSRP value that the base station statistically processes at a time point after the parameter of the antenna of the base station is adjusted, and a relative value of the RSRP may be determined as 100. The second threshold may be determined as a relative value of 50. In this case, a difference between the first indicator value and the third indicator value is equal to 60, and the value of the difference is greater than or equal to the predetermined second threshold. Thus, the control unit 273 determines that the environment of the wireless communication network is optimized.

In contrast, when it is determined that the difference between the first indicator value and the third indicator value is less than the predetermined second threshold, the control unit 273 does not determine that the environment of the wireless communication network is improved enough to exceed the particular level, although the parameter of the antenna of the base station is adjusted in view of the environment of the wireless communication network which has previously been determined to be degraded. The control unit 273 receives, from the base station, network information at a time point of the determination, generates a signal for again adjusting the parameter of the antenna of the base station on the basis of the network information, and transmits the generated signal to the base station via the transmission unit 275.

After the parameter of the antenna of the base station is adjusted, a validation check is performed again, and a specific procedure for the validation check is identical to the above-described procedure. When, as a result of performing the validation check, the control unit 273 does not determine again that the environment of the wireless communication network is improved enough to exceed the particular level although the parameter of the antenna of the base station has been adjusted again, the control unit 273 receives, from the base station, network information at a time point of the determination, generates a signal for again adjusting the parameter of the antenna of the base station on the basis of the network information, and transmits the generated signal to the base station via the transmission unit 275. In this manner, the parameter of the antenna of the base station is repeatedly adjusted until it is determined that the environment of the wireless communication network is optimized.

Figure 3:
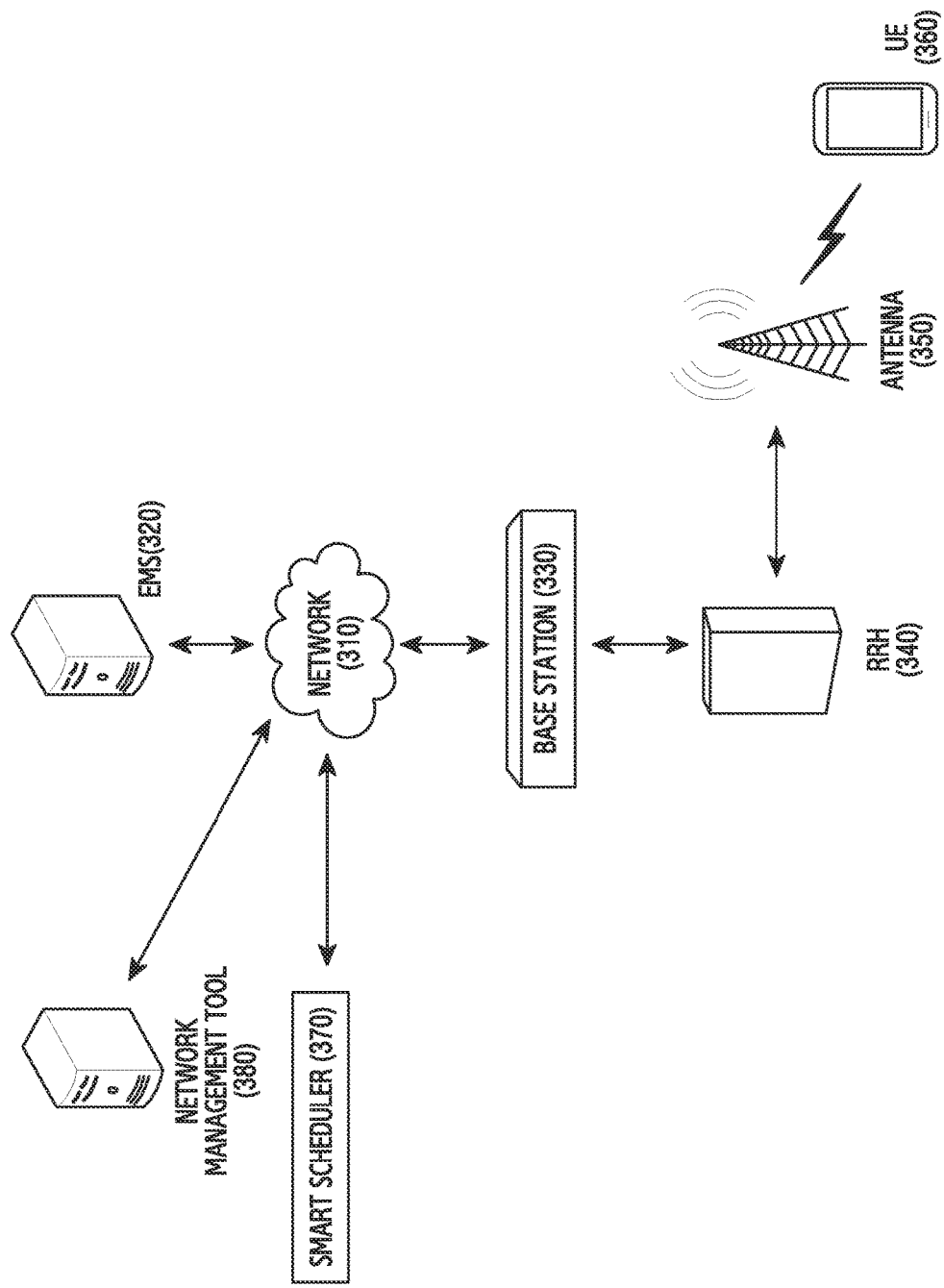
FIG. 3 illustrates a configuration of a network in a wireless communication system according to an embodiment of the present disclosure.

FIG. 3 illustrates a configuration of a network in a wireless communication system according to an embodiment of the present disclosure.

Referring to FIG. 3, an EMS 320 and a base station 330 may be connected to a network 310. Also, an RRH 340 and an antenna 350 may be combined with the base station 330, or may be included in the base station 330. Further, a UE 360 may be connected to the base station 330, and as a result, may be connected to the network 310 through the base station 330.

The network 310 refers to a combination of electrical communication devices, electrical communication apparatuses, and transmission lines which enable geographically-separated apparatuses to access each other and to exchange information with each other. Also, the EMS 320 capable of being connected to the network 310 may be referred to as an "EMS server," an "element management server," and the like, and typically serves to control and manage multiple base stations.

Further, the base station 330 is a device that controls a particular cell, and may serve as an intermediary between a UE and an exchange office which are included in the particular cell controlled by the base station 330. For example, in the case of an LTE wireless communication system, the base station 330 may include an eNB. Particularly, in the LTE wireless communication system, the eNB may include an RU and a DU. In this case, the RU may process an RF signal. Also, only the RU may be separated from the base station 330, and the separated unit may be referred to as an "RRU" or an "RRH." In addition, the DU is a unit that processes a digital signal, and may be referred to as a "BBU."

The RRH 340 capable of being combined with the base station 330 refers to a unit capable of processing an RF signal in the LTE wireless communication system, as described above. Also, the antenna 350 is a unit that efficiently transmits/receives a radio signal through space in order to achieve the purpose of communication in wireless communication, and may include an omni-directional antenna, a directional antenna, and/or the like.

In addition, the UE 360 refers to an apparatus that is connected to a communication network in order to transmit/receive data or a message. Particularly, in the wireless communication system, the UE 360 may be connected to the base station 330, and as a result, may be connected to the network 310 through the base station 330.

A smart scheduler 370 may be combined with the network 310, or may be included in the network 310. Alternatively, the smart scheduler 370 may be combined with the base station 330, or may be included in the base station 330. Also, the smart scheduler 370 may include a smart self organizing & optimizing network (SON) server. Particularly, the smart scheduler 370 serves to provide the base station 330 with a basic parameter or basic data required for the base station 330.

After receiving first network information and second network information from the base station 330, the smart scheduler 370 according to an embodiment of the present disclosure transmits, to the base station 330, a signal for adjusting a parameter of the base station antenna 350, when a difference between a first indicator value included in the first network information and a second indicator value included in second network information previously received from the base station 330 is greater than or equal to a threshold. In this case, the first network information may be received after a predetermined cycle from a time point of receiving the second network information.

The smart scheduler 370 receives network information from the base station 330. In this case, the network information may be set to be periodically received from the base station 330. Also, the network information may include UE-based network environment information and base station-based network environment information. At this time, the UE-based network environment information signifies network environment information that the UE reports to the base station, and may include, for example, information included in a measurement report, uplink SRS power information, and the like.

Typically, the UE that accesses the base station serves to report current RF environment information to the base station, which is referred to as a "measurement report." At this time, the base station may set the UE to periodically perform the measurement report. Alternatively, the base station may set the UE to perform the measurement report only when a particular event (e.g., a handover) occurs.

For example, the measurement report may include RF environment information, such as RSRP or RSRQ of a serving base station or a neighboring base station. Specifically, the UE 360 may transmit, to the base station 330, the measurement report including the RF environment information, such as RSRP and RSRQ. Thus, the base station 330 may collect the actual RF environment information within a cell currently provided with a wireless communication service on the basis of the received measurement report. Also, the base station may statistically process the information collected through the measurement report, and may utilize the statistically-processed information as criteria data for determining whether an RF environment change subsequently occurs.

As described above, the UE-based network environment information may include uplink SRS power information. In this case, the UE 360 may transmit the SRS power value to the serving base station 330 or a neighboring base station (not illustrated in FIG. 3) at a particular point within a cell currently provided with a wireless communication service. In response, the serving base station 330 or the neighboring base station may receive the SRS power value, and thereby may collect, in real time, the actual RF environment information within the cell currently provided with the wireless communication service.

The network information may include base station-based network environment information. The base station-based network environment information signifies information that the base station finally collects on the basis of base station-related operation information of the UE. The base station-based network environment information may include, for example, RRC connection-related information, call drop-related information, information on a relation between cells, and the like.

The information on the relation between cells includes information on a relation between a serving base station, that currently provides a communication service, and a neighboring base station, with a particular UE as a reference. Also, the information on the relation between cells includes information on a relation between a base station, which is located relatively near the particular UE with the particular UE as the reference and has a high possibility of currently affecting communication performed by the particular UE, and a base station which is located relatively far away from the particular UE with the particular UE as the reference and has a low possibility of currently affecting the communication performed by the particular UE.

Further, the information on the relation between cells includes information on a relation between a base station, which is located relatively near the particular UE with the particular UE as the reference and has a high possibility that the particular UE is handed over, and a base station which is located relatively far away from the particular UE with the particular UE as the reference and has a low possibility that the particular UE is handed over. As a result, the base station may acquire relative relation information between the particular UE and multiple base stations, and thereby may collect, in real time, the actual RF environment information within a cell currently provided with a wireless communication service. Then, the base station may statistically process the collected information, and may utilize the statistically-processed information as criteria data for determining whether an RF environment change subsequently occurs.

In addition, in relation to the RRC connection, in, for example, the LTE wireless communication system, the UE communicates with the base station through an RRC protocol. Specifically, in order to communicate with the base station, the UE transmits an RRC connection request message to the base station, the base station transmits an RRC connection setup message for resource allocation to the UE in response to the RRC connection request message, and the UE sets up a connection with the base station on the basis of the allocated resources.

As described above, in relation to the RRC connection with the base station 330 by the UE 360, the base station 330 may identify the RRC connection request message, and thereby may collect information on how many connection attempts are currently made by UEs in the wireless communication system, in addition to information on how many UEs currently succeed in making the connections among the multiple UEs attempting the connections in the wireless communication system. Also, based on RRC connection information and call drop-related information described below, the base station may collect information on how many UEs there are which have terminated the connections thereof and attempt reconnections among the UEs previously connected to the base station, in addition to information on how many UEs succeed in making the connections among the multiple UEs attempting the reconnections. As a result, the base station 330 may acquire the pieces of information related to the RRC connections of the UEs, and thereby may collect, in real time, the actual RF environment information within a cell currently provided with a wireless communication service. The base station 330 may statistically process the collected information, and may utilize the statistically-processed information as criteria data for determining whether an RF environment change subsequently occurs.

Also, the call drop signifies a phenomenon in which a telephone call is terminated due to the failure of a wireless section before a mobile communication subscriber completes the telephone call. In this regard, the base station 330 may collect information on the number of UEs in which call drops occur among multiple UEs currently being connected to the base station 330, and thereby may collect, in real time, the actual RF environment information within a cell currently provided with a wireless communication service. The base station 330 may statistically process the collected information, and may utilize the statistically-processed information as criteria data for determining whether an RF environment change subsequently occurs.

The smart scheduler 370 transmits, to the base station 330, a signal for adjusting a parameter of the base station antenna 350, when a difference between a first indicator value included in first network information and a second indicator value included in second network information previously received from the base station 330 is greater than or equal to a first threshold.

The smart scheduler 370 compares the first indicator value included in the first network information with the second indicator value included in the second network information previously received from the base station 330. As described above, the network information may include the UE-based network environment information, which includes, for example, information such as RSRP or RSRQ of a serving base station or a neighboring base station which is included in a measurement report, uplink SRS power information, and the like, and the base station-based network environment information which includes, for example, RRC connection-related information, call drop-related information, information on a relation between cells, and the like.

The first indicator value included in the first network information may be a particular value indicating at least one piece of network environment information included in the multiple pieces of network environment information described above as an example. For example, the first indicator value may be determined as at least one value from among an RSRP value, an RSRQ value, an uplink SRS power value, the number of UEs currently being connected to a base station, and the number of UEs in which call drops occur, which are based on the actual RF environment information within a cell currently provided with a wireless communication service.

Also, the network information may be set to be periodically received from the base station. Thus, second network information may also separately exist which is received from the base station at a time point (hereinafter referred to as a "previous time point") preceding a time point of determining the first indicator value by a time period corresponding to a particular predetermined cycle. In this case, as described above, the second network information may also include UE-based network environment information, which includes, for example, information such as RSRP or RSRQ of a serving base station or a neighboring base station which is included in a measurement report, uplink SRS power information, and the like, and base station-based network environment information which includes, for example, RRC connection-related information, call drop-related information, information on a relation between cells, and the like.

The second indicator value included in the second network information may be a particular value indicating at least one piece of network environment information included in the multiple pieces of second network environment information described above as an example. For example, the second indicator value may be determined as at least one value from among an RSRP value, an RSRQ value, an uplink SRS power value, the number of UEs currently being connected to a base station, and the number of UEs in which call drops occur, which are set at the previous time point.

The smart scheduler 370 compares the first indicator value with the second indicator value. Specifically, the smart scheduler 370 determines whether a difference between the first indicator value and the second indicator value is greater than or equal to a predetermined first threshold. For example, the first indicator value may be determined as an RSRP value that the base station 330 statistically processes at a current time point, and the second indicator value may be determined as an RSRP value that the base station 330 has statistically processed at the previous time point. In this case, the smart scheduler 370 determines whether a difference between the RSRP value at the current time point and the RSRP value at the previous time point is greater than or equal to the first threshold.

When it is determined that the difference between the first indicator value and the second indicator value is greater than or equal to the predetermined first threshold, the smart scheduler 370 determines that an environment of a wireless communication network is currently degraded enough to need to be adjusted. For example, when consideration is given to a case where the boundary of the coverage of the particular base station 330 is adjacent to the boundary of a river and a UE does not exist on the surface of the river, the second indicator value indicating network environment information within the coverage may be determined as an RSRP value that the particular base station 330 has statistically processed at the previous time point, and a relative value of the RSRP may be determined as 100.

When consideration is given to a case where a new bridge is constructed over the river, new movement of a UE occurs through the new bridge, and UEs on the bridge deviate from the existing coverage. Thus, the first indicator value may be determined as an RSRP value that the particular base station 330 statistically processes at a current time point, and a relative value of the RSRP may be determined as 40. In this case, it is obvious that the RSRP value at the current time point becomes less than the RSRP value at the previous time point, and a reduction in the RSRP value signifies a reduction in a received strength of the RS. Thus, it is also obvious that the environment of the wireless communication network is currently degraded.

However, a determination as to whether the environment of the wireless communication network 310 is currently degraded enough to need to be adjusted is distinguished from a determination that the environment of the wireless communication network 310 has been simply degraded. In other words, when the degree of degradation is quantified and the environment of the wireless communication network 310 is degraded enough to exceed a particular level, in the embodiment of keeping the wireless communication network 310 balanced, it is desirable to determine that the environment of the wireless communication network 310 is currently degraded enough to need to be adjusted. At this time, the particular level is determined as the first threshold.

According to the above-described example, the first threshold may be determined as a relative value of 50. In this case, a difference between the first indicator value and the second indicator value is equal to 60, and the value of the difference is greater than or equal to the predetermined first threshold. Thus, the smart scheduler 370 may determine that the environment of the wireless communication network 310 has been degraded enough to exceed the particular level, and as a result, may determine that the environment of the wireless communication network 310 has currently been degraded enough to need to be adjusted.

When it is determined that the difference between the first indicator value and the second indicator value is greater than or equal to the predetermined first threshold, the smart scheduler 370 generates a signal for changing a parameter of the antenna 350 of the base station 330, and transmits the generated signal to the base station 330. In this case, examples of the parameter of the antenna 350 of the base station 330 may include at least one of a tilt of the antenna 350, a direction thereof, a height thereof, and a gain thereof.

For example, a tilt value of the antenna may be adjusted by the smart scheduler 370. Specifically, the tilt value of the antenna signifies a tilt angle that the axis of a directional antenna makes with a horizontal plane. The smart scheduler 370 transmits, to the base station, a signal for adjusting the tilt value of the antenna, and the tilt value of the antenna is adjusted through the base station. Also, the tilt value may be adjusted in a unit of particular predetermined operation.

As in the above-described example, when the construction of the new bridge causes multiple UEs to be outside the existing coverage and thus there is a reduction in the RSRP value statistically processed by the base station, the tilt value of the antenna 350 may be adjusted to include the bridge area in the existing coverage through up-tilt.

After the parameter of the antenna 350 is adjusted, the smart scheduler 370 performs a validation check. In other words, the smart scheduler 370, which determines that the environment of the wireless communication network 310 has been degraded enough to exceed the particular level, may adjust the parameter of the antenna 350 of the base station. A process may be performed for checking whether the environment of the wireless communication network 310 recovers the existing level as a result of adjusting the parameter of the antenna 350 by the smart scheduler 370.

Specifically, after the parameter of the antenna 350 of the base station 330 is adjusted, when an indicator value included in third network information received from the base station 330 is defined as a third indicator value, the smart scheduler 370 may perform the validation check by comparing the first indicator value with the third indicator value. In other words, the smart scheduler 370 determines whether a difference between the first indicator value and the third indicator value is greater than or equal to a predetermined second threshold. When it is determined that the value of the difference is greater than or equal to the second threshold, the smart scheduler 370 determines that the environment of the wireless communication network 310 is optimized. This is because, when it is determined that the value of the difference is greater than or equal to the second threshold, the parameter of the antenna 350 of the base station is adjusted in view of the environment of the wireless communication network 310, which has previously been determined to be degraded, and then the environment of the wireless communication network 310 may be regarded as being improved enough to exceed the particular level.

For example, the first indicator value may be determined as an RSRP value that the base station 330 statistically processes at the current time point, and a relative value of the RSRP may be determined as 40. The third indicator value may be determined as an RSRP value that the base station 330 statistically processes at a time point after the parameter of the antenna 350 of the base station 330 is adjusted, and a relative value of the RSRP may be determined as 100. The second threshold may be determined as a relative value of 50. In this case, a difference between the first indicator value and the third indicator value is equal to 60, and the value of the difference is greater than or equal to the predetermined second threshold. Thus, the smart scheduler 370 determines that the environment of the wireless communication network 310 is optimized.

In contrast, when it is determined that the difference between the first indicator value and the third indicator value is less than the predetermined second threshold, the smart scheduler 370 does not determine that the environment of the wireless communication network 310 is improved enough to exceed the particular level, although the parameter of the antenna 350 of the base station 330 is adjusted in view of the environment of the wireless communication network 310 which has previously been determined to be degraded. The smart scheduler 370 receives, from the base station 330, network information at a time point of the determination, generates a signal for again adjusting the parameter of the antenna 350 of the base station 330 on the basis of the network information, and transmits the generated signal to the base station 330.

After the parameter of the antenna 350 of the base station 330 is adjusted, a validation check is performed again, and a specific procedure for the validation check is identical to the above-described procedure. When, as a result of performing the validation check, the smart scheduler 370 does not determine again that the environment of the wireless communication network 310 is improved enough to exceed the particular level although the parameter of the antenna 350 of the base station 330 has been adjusted again, the smart scheduler 370 receives, from the base station 330, network information at a time point of the determination, generates a signal for again adjusting the parameter of the antenna 350 of the base station 330 on the basis of the network information, and transmits the generated signal to the base station 330. In this manner, the parameter of the antenna 350 of the base station 330 is repeatedly adjusted until it is determined that the environment of the wireless communication network 310 is optimized.

A network management tool 380 refers to a device to which a manager of the wireless communication system is connected and through which the manager generally controls the smart scheduler 370. Particularly, the network management tool 380 may include a smart SON graphical user interface (smart SON GUI). Also, a threshold and the like, which are required during an operation of the smart scheduler 370, may be determined and adjusted through the network management tool 380.

Figure 4:
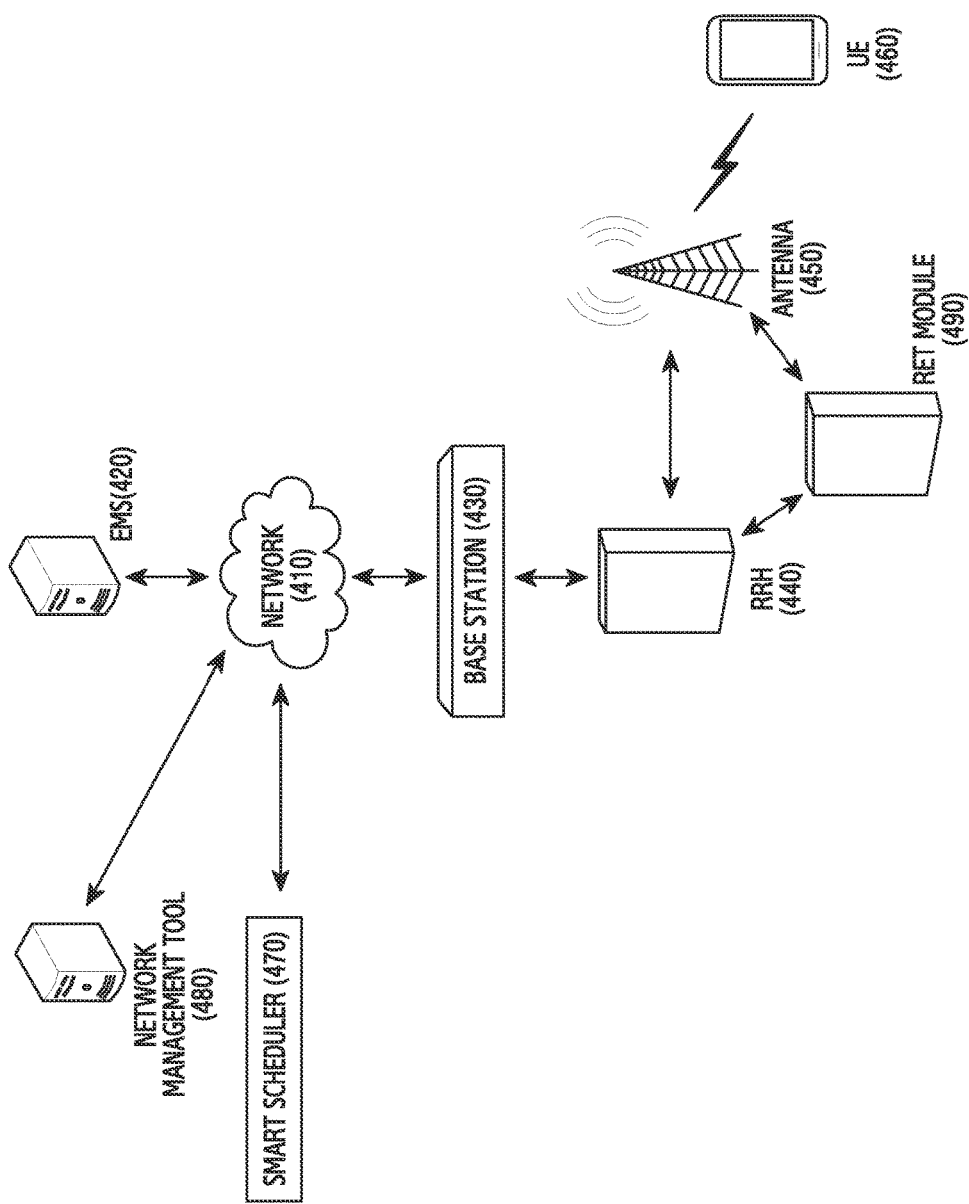
FIG. 4 illustrates a configuration of a network in a wireless communication system according to an embodiment of the present disclosure.

FIG. 4 illustrates a configuration of a network in a wireless communication system according to an embodiment of the present disclosure.

Referring to FIG. 4, an EMS 420 and a base station 430 may be connected to a network 410. Also, an RRH 440 and an antenna 450 may be combined with the base station 430, or may be included in the base station 430. Also, a UE 460 may be connected to the base station 430, and as a result, may be connected to the network 410 through the base station 430. Further, the EMS 420 capable of being connected to the network 410 may be referred to as an "EMS server," an "element management server," and the like, and typically serves to control and manage multiple base stations.

Further, the base station 430 is a device that controls a particular cell. For example, in the case of an LTE wireless communication system, the base station 430 may include an eNB. Particularly, in the LTE wireless communication system, the eNB may include a RU and a DU. In this case, the RU may process an RF signal. Also, only the RU may be separated from the base station 430, and the separated unit may be referred to as an "RRU" or an "RRH." In addition, the DU is a unit that processes a digital signal, and may be referred to as a "BBU."

The RRH 440 capable of being combined with the base station 430 refers to a unit capable of processing an RF signal in the LTE wireless communication system, as described above. Also, the antenna 450 is a unit that efficiently transmits/receives a radio signal through space in order to achieve the purpose of communication in wireless communication, and may include an omni-directional antenna, a directional antenna, and/or the like.

In addition, the UE 460 refers to an apparatus that is connected to a communication network in order to transmit/receive data or a message. Particularly, in the wireless communication system, the UE 460 may be connected to the base station 430, and as a result, may be connected to the network 410 through the base station 430.

A smart scheduler 470 may be combined with the network 410, and serves to provide the base station 430 with a basic parameter or basic data required for the base station 430. Also, the smart scheduler 470 may include a smart SON server.

After receiving first network information and second network information from the base station 430, the smart scheduler 470 according to an embodiment of the present disclosure transmits, to the base station 430, a signal for adjusting a parameter of the base station antenna 450, when a difference between a first indicator value included in the first network information and a second indicator value included in second network information previously received from the base station 430 is greater than or equal to a threshold.

The smart scheduler 470 receives network information from the base station 430. In this case, the network information may be set to be periodically received from the base station 430. Also, the network information may include UE-based network environment information and base station-based network environment information. At this time, the UE-based network environment information signifies network environment information that the UE reports to the base station, and may include, for example, information such as RSRP or RSRQ of a serving base station or a neighboring base station which is included in a measurement report, uplink SRS power information, and the like. Also, the base station-based network environment information signifies information that the base station finally collects on the basis of base station-related operation information of the UE, and may include, for example, RRC connection-related information, call drop-related information, information on a relation between cells, and the like. Further, the smart scheduler 470 may statistically process the collected information, and may utilize the statistically-processed information as criteria data for determining whether an RF environment change subsequently occurs.

The smart scheduler 470 transmits to the base station 430, a signal for adjusting a parameter of the base station antenna

450, when a difference between the first indicator value included in the first network information and the second indicator value included in the second network information previously received from the base station 430 is greater than or equal to a first threshold.

The first indicator value included in the first network information may be a particular value indicating at least one piece of network environment information included in the multiple pieces of network environment information described above as an example. Also, the network information may be set to be periodically received from the base station. Thus, second network information may also separately exist which is received from the base station at a time point (hereinafter, referred to as a "previous time point") preceding a time point of determining the first indicator value by a time period corresponding to a particular predetermined cycle. The second indicator value included in the second network information may be a particular value indicating at least one piece of network environment information included in the multiple pieces of previously-received second network environment information described above as an example.

The smart scheduler 470 compares the first indicator value with the second indicator value. Specifically, the smart scheduler 470 determines whether a difference between the first indicator value and the second indicator value is greater than or equal to the predetermined first threshold. When it is determined that the difference between the first indicator value and the second indicator value is greater than or equal to the predetermined first threshold, the smart scheduler 470 generates a signal for changing a parameter of the antenna 450 of the base station 430, and transmits the generated signal to the base station 430. In this case, examples of the parameter of the antenna 450 of the base station 430 may include at least one of a tilt of the antenna 450, a direction thereof, a height thereof, and a gain thereof.

For example, a tilt value of the antenna 450 may be adjusted by the smart scheduler 470. Specifically, the tilt value of the antenna 450 signifies a tilt angle that the axis of a directional antenna makes with a horizontal plane. A remote electrical tilt (RET) module 490 may electronically change the tilt value of the antenna 450 by changing the phase of an element included in the antenna 450. In other words, according to an embodiment of the present disclosure, a phase may be changed by physically adjusting the directions of multiple elements which are included in the antenna 450 and are disposed in parallel. Through the change of the phase, the tilt value of the antenna 450 may be electronically changed. Alternatively, according to another embodiment of the present disclosure, the change of the phase of a radiation signal of each element included in the antenna 450 may change the tilt value of the antenna 450.

The RET module 490 may be combined with the base station 430, or may be included in the base station 430, and may be combined with the RRH 440 and the antenna 450.

A process for adjusting the tilt value of the antenna 450 is described in detail. When it is determined that the difference between the first indicator value and the second indicator value is greater than or equal to the first threshold, the smart scheduler 470 transmits, to the base station 430, a signal for changing the phase of an element included in the base station antenna 450. The base station 430, which receives the signal, may control the RET module 490. Through the control of the RET module 490 by the base station 430, the RET module 490 may adjust the tilt value of the antenna 450, and thereby may adjust the coverage of the base station 430, the degree of interference between the base station 430 and another base station, and the like. Also, the tilt value may be adjusted in a unit of particular predetermined operation.

After the parameter of the antenna 450 is adjusted, the smart scheduler 470 performs a validation check. In other words, a process may be performed for checking whether the environment of the wireless communication network 410 recovers the existing level as a result of adjusting the parameter of the base station antenna 450 by the smart scheduler 470.

Specifically, after the parameter of the antenna 450 of the base station 430 is adjusted, when an indicator value included in third network information received from the base station 430 is defined as a third indicator value, the smart scheduler 470 may perform the validation check by comparing the first indicator value with the third indicator value. In other words, the smart scheduler 470 determines whether a difference between the first indicator value and the third indicator value is greater than or equal to a predetermined second threshold. When it is determined that the value of the difference is greater than or equal to the second threshold, the smart scheduler 470 determines that the environment of the wireless communication network 410 is optimized.

In contrast, when it is determined that the difference between the first indicator value and the third indicator value is less than the predetermined second threshold, the smart scheduler 470 does not determine that the environment of the wireless communication network 410 is improved enough to exceed the particular level, although the parameter of the antenna 450 of the base station 430 is adjusted in view of the environment of the wireless communication network 410 which has previously been determined to be degraded. The smart scheduler 470 receives, from the base station 430, network information at a time point of the determination, generates a signal for again adjusting the parameter of the antenna 450 of the base station 430 on the basis of the network information, and transmits the generated signal to the base station 430.

After the parameter of the antenna 450 of the base station 430 is adjusted, a validation check is performed again, and a specific procedure for the validation check is identical to the above-described procedure. When, as a result of performing the validation check, the smart scheduler 470 does not determine again that the environment of the wireless communication network 410 is improved enough to exceed the particular level although the parameter of the antenna 450 of the base station 430 has been adjusted again, the smart scheduler 470 receives, from the base station 430, network information at a time point of the determination, generates a signal for again adjusting the parameter of the antenna 450 of the base station 430 on the basis of the network information, and transmits the generated signal to the base station 430. In this manner, the parameter of the antenna 450 of the base station 430 is repeatedly adjusted until it is determined that the environment of the wireless communication network 410 is optimized.

A network management tool 480 refers to a device to which a manager of the wireless communication system is connected and through which the manager generally controls the smart scheduler 470. Particularly, the network management tool 480 may include a smart SON GUI. Also, a threshold and the like, which are required during an operation of the smart scheduler 470, may be determined and adjusted through the network management tool 480.

Figure 5:
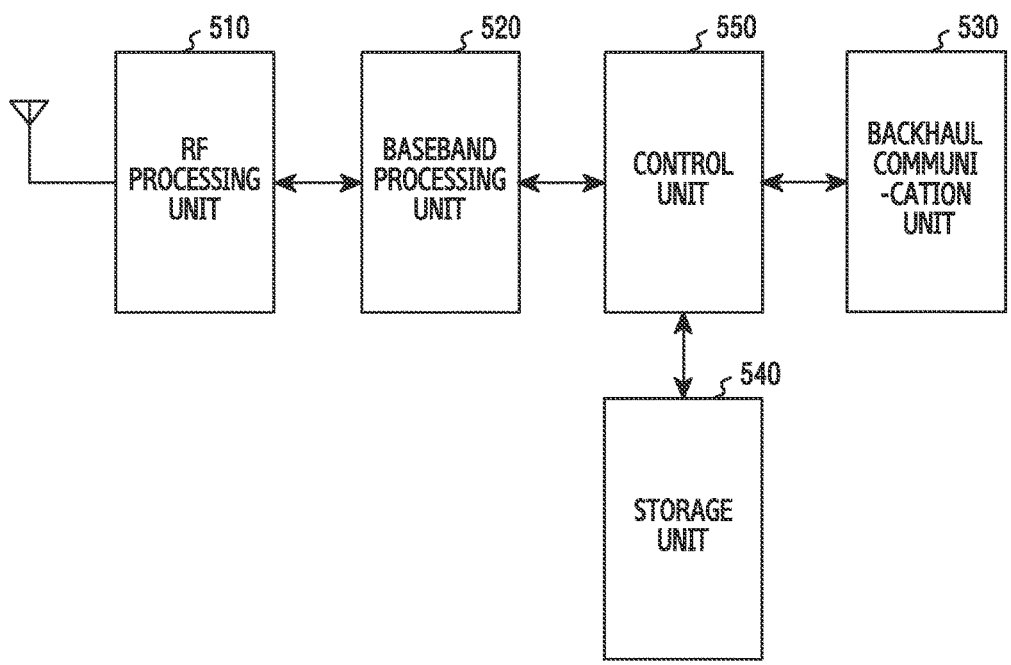
FIG. 5 illustrates a block configuration of a base station device in a wireless communication system according to an embodiment of the present disclosure.

FIG. 5 illustrates a block configuration of a base station device in a wireless communication system according to an embodiment of the present disclosure.

Referring to FIG. 5, the base station includes an RF processing unit 510, a baseband processing unit 520, a backhaul communication unit 530, a storage unit 540, and a control unit 550.

The RF processing unit 510 performs functions for transmitting and receiving signals through a wireless channel, such as band conversion of a signal, amplification thereof, and the like. Specifically, the RF processing unit 510 up-converts a baseband signal, which is provided by the baseband processing unit 520, to an RF band signal, and then transmits the RF band signal through an antenna. The RF processing unit 510 down-converts an RF band signal, which is received through the antenna, to a baseband signal. For example, the RF processing unit 510 may include a transmission filter, a reception filter, an amplifier, a mixer, an oscillator, a digital-to-analog converter (DAC), an analog-to-digital converter (ADC), and the like. Although only one antenna is illustrated in FIG. 5, the base station may be provided with multiple antennas. Also, the RF processing unit 510 may include multiple RF chains. Further, the RF processing unit 510 may perform beamforming. For the beamforming, the RF processing unit 510 may adjust the phase and the strength of each of signals transmitted and received through multiple antennas or multiple antenna elements.

The baseband processing unit 520 performs a function of conversion between a baseband signal and a bit stream in accordance with a physical layer standard of a system. For example, when data is transmitted, the baseband processing unit 520 generates complex symbols by encoding and modulating a transmission bit stream. Also, when data is received, the baseband processing unit 520 reconstructs a reception bit stream by demodulating and decoding a baseband signal provided by the RF processing unit 510. For example, when an orthogonal frequency division multiplexing (OFDM) scheme is followed, during data transmission, the baseband processing unit 520 generates complex symbols by encoding and modulating a transmission bit stream, maps the complex symbols to subcarriers, and constructs OFDM symbols through inverse fast fourier transform (IFFT) operation and cyclic prefix (CP) insertion. Further, when data is received, the baseband processing unit 520 divides, in a unit of OFDM symbol, a baseband signal provided by the RF processing unit 510, reconstructs signals mapped to subcarriers through FFT operation, and reconstructs a reception bit stream through demodulation and decoding. The baseband processing unit 520 and the RF processing unit 510 transmit and receive signals as described above.

The backhaul communication unit 530 provides an interface for communicating with other nodes within the network. Specifically, the backhaul communication unit 530 converts a bit stream transmitted from the base station to another node (e.g., another base station, a core network, and the like) into a physical signal, and converts a physical signal received from said another node into a bit stream.

According to an embodiment of the present disclosure, the backhaul communication unit 530 may include a transmission/reception unit. The transmission/reception unit may transmit first network information and second network information, and may receive a first signal to adjust a parameter of the base station antenna, when a difference between a first indicator value included in the first network information and a second indicator value included in the second network information is greater than or equal to a first threshold.

The storage unit 540 stores data, such as a basic program, an application program, and setting information, and the like, for an operation of the base station. Also, the storage unit 540 provides the stored data according to a request of the control unit 550.

The control unit 550 controls overall operations of the base station. For example, the control unit 550 transmits and receives signals via the baseband processing unit 520 and the RF processing unit 510, or via the backhaul communication unit 530. Also, the control unit 550 records data in the storage unit 540, and reads data therefrom. To this end, the control unit 550 may include at least one processor.

According to an embodiment of the present disclosure, the control unit 550 may adjust a tilt value of the antenna. Specifically, the tilt value of the antenna signifies a tilt angle that the axis of a directional antenna makes with a horizontal plane. The change of the phase of an element included in the antenna may electronically adjust the tilt value of the antenna. In other words, according to an embodiment of the present disclosure, a phase may be changed by physically adjusting the directions of multiple elements which are included in the antenna and are disposed in parallel. Through the change of the phase, the tilt value of the antenna may be electronically changed. Alternatively, according to an embodiment of the present disclosure, the change of the phase of a radiation signal of each element included in the antenna may change the tilt value of the antenna. As a result, through the adjustment of the tilt value of the antenna by the control unit 550, it is possible to adjust the coverage of the base station, the degree of interference between the base station and another base station, and the like. Also, the tilt value may be adjusted in a unit of a predetermined particular operation.

Figure 6:
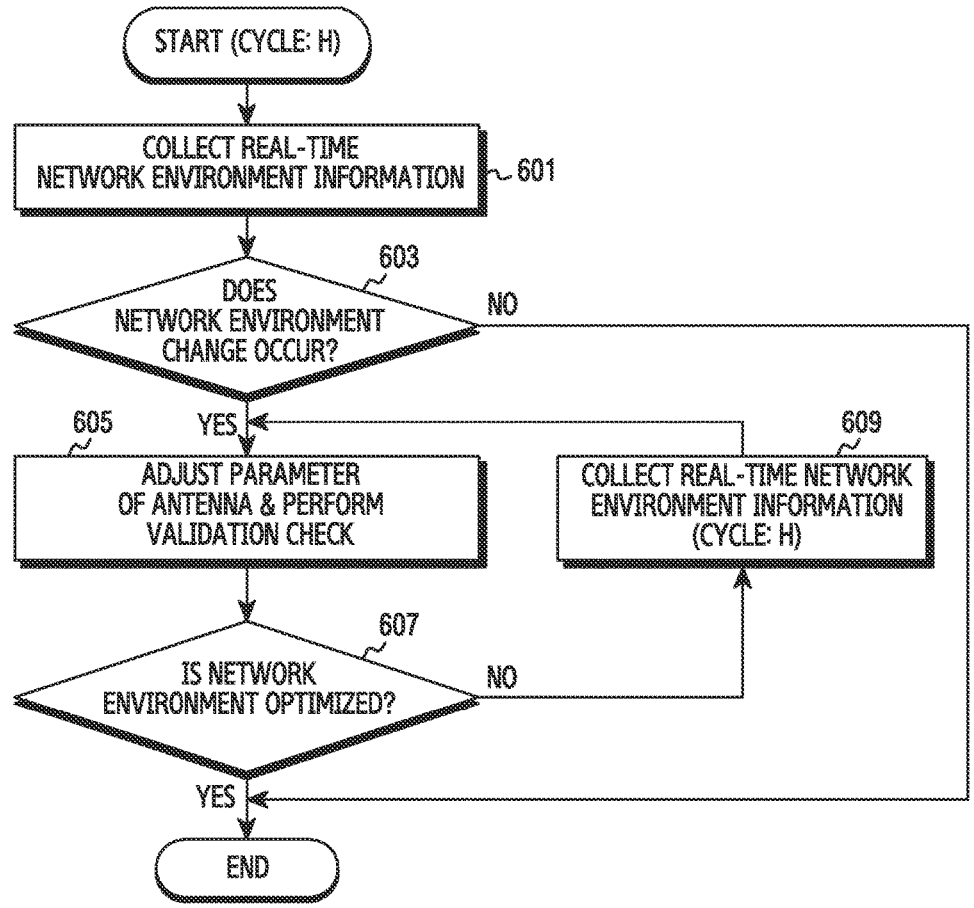
FIG. 6 is a flowchart illustrating the optimization of a network in a wireless communication system according to an embodiment of the present disclosure.

FIG. 6 is a flowchart illustrating the optimization of a network in a wireless communication system according to an embodiment of the present disclosure.

Referring to FIG. 6, a cycle H represents an entire cycle during which a process is performed to optimize the wireless communication network. In other words, in every predetermined cycle H, the wireless communication network is monitored and the optimization process is performed. Also, the value of the cycle H may be determined as that of a relatively long time period, such as, for example, one month, one week, one day.

In operation 601, an electronic device according to an embodiment of the present disclosure collects real-time network environment information. The real-time network environment information may include UE-based network environment information and base station-based network environment information. At this time, the UE-based network environment information signifies network environment information that UE reports to a base station, and may include, for example, information such as RSRP or RSRQ of a serving base station or a neighboring base station which is included in a measurement report, uplink SRS power information, and the like. Also, the base station-based network environment information signifies information that the base station finally collects on the basis of base station-related operation information of the UE, and may include, for example, RRC connection-related information, call drop-related information, information on a relation between cells, and the like. Further, the electronic device may statistically process the collected information, and may utilize the statistically-processed information as criteria data for determining whether a network environment change subsequently occurs.

In operation 603, the electronic device determines whether a network environment change occurs. Specifically, the electronic device determines whether a difference between a first indicator value, which is included in the multiple pieces of currently-received first network environment information, and a second indicator value, which is included in second network environment information previously received from the base station, is greater than or equal to a threshold.

The first indicator value included in the network information may be a particular value indicating at least one piece of network information included in the multiple pieces of real-time network information described above as an example. Also, the network information may be set to be periodically received from the base station. Thus, second network information may also separately exist which is received from the base station at a time point (hereinafter, referred to as a "previous time point") preceding a time point of determining the first indicator value by a time period corresponding to a particular predetermined cycle. The second indicator value included in the second network information may be a particular value indicating at least one piece of network environment information included in the multiple pieces of second network environment information described above as an example.

In operation 603, when it is determined that the difference between the first indicator value and the second indicator value is less than a first threshold, the procedure according to an embodiment of the present disclosure is terminated. In contrast, when it is determined that the difference between the first indicator value and the second indicator value is greater than or equal to the first threshold, the electronic device proceeds to operation 605, and adjusts a parameter of an antenna.

Specifically, in operation 605, the electronic device generates a signal for adjusting a parameter of the antenna of the base station, and transmits the generated signal to the base station. In this case, examples of the parameter of the antenna of the base station may include at least one of a tilt of the antenna, a direction thereof, a height thereof, and a gain thereof. For example, a tilt value of the antenna may be adjusted by the electronic device.

After the parameter of the antenna is adjusted, in operation 605, the electronic device performs a validation check. In other words, a process may be performed for checking whether an environment of the wireless communication network recovers the existing level as a result of adjusting the parameter of the antenna of the base station by the electronic device. Specifically, after the parameter of the antenna of the base station is adjusted, when an indicator value included in third network information received from the base station is defined as a third indicator value, the electronic device may perform the validation check by comparing the first indicator value with the third indicator value.

In operation 607, as a result of performing the validation check, the electronic device determines whether the environment of the wireless communication network is optimized. In other words, the electronic device determines whether a difference between the first indicator value and the third indicator value is greater than or equal to a predetermined second threshold. When it is determined that the value of the difference is greater than or equal to the second threshold, the electronic device determines that the environment of the wireless communication network is optimized, and the procedure according to an embodiment of the present disclosure is terminated.

When it is determined in operation 607 that the difference between the first indicator value and the third indicator value is less than the predetermined second threshold, the electronic device determines that the environment of the wireless communication network is not yet optimized, and proceeds to operation 609.

In operation 609, at a time point of determining that the environment of the wireless communication network is not yet optimized, the electronic device again collects real-time network environment information. In this case, the network environment information is identical to the network environment information described in operation 601, and is only different therefrom with respect to a time point of collecting the network environment information. A cycle, during which the real-time network environment information is collected again, is determined as h. The cycle H signifies a cycle, during which the parameter of the antenna is minutely and repeatedly adjusted in order to optimize the network environment, and is determined as the value of a relatively short time period, such as one hour. Then, the electronic device proceeds to operation 605, and operations 605, 607, and 609 are repeated until the environment of the wireless communication network is optimized.

Figure 7:
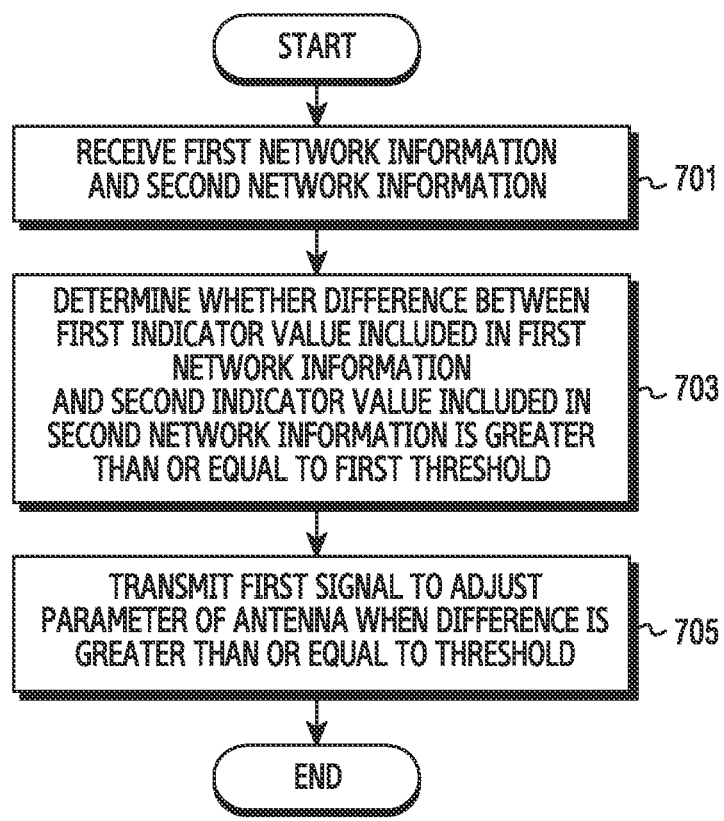
FIG. 7 is a flowchart illustrating the optimization of a network in a wireless communication system according to an embodiment of the present disclosure.

FIG. 7 is a flowchart illustrating the optimization of a network in a wireless communication system according to an embodiment of the present disclosure.

Referring to FIG. 7, first, in operation 701, the electronic device according to an embodiment of the present disclosure receives first network information and second network information. The network information may include UE-based network environment information and base station-based network environment information. At this time, the UE-based network environment information signifies network environment information that a UE reports to a base station, and may include, for example, information such as RSRP or RSRQ of a serving base station or a neighboring base station which is included in a measurement report, uplink SRS power information, and the like. Also, the base station-based network environment information signifies information that the base station finally collects on the basis of base station-related operation information of the UE, and may include, for example, RRC connection-related information, call drop-related information, information on a relation between cells, and the like. Further, the electronic device may statistically process the collected information, and may utilize the statistically-processed information as criteria data for determining whether a network environment change subsequently occurs.

In operation 703, the electronic device determines whether a difference between a first indicator value included in the first network information and a second indicator value included in the second network information is greater than or equal to a first threshold. The first indicator value included in the first network information may be a particular value indicating at least one piece of network information included in the multiple pieces of real-time network information described above as an example. Also, the network information may be set to be periodically received from the base station. Thus, second network information may also separately exist which is received from the base station at a time point (hereinafter, referred to as a "previous time point") preceding a time point of determining the first indicator value by a time period corresponding to a particular predetermined cycle. The second indicator value included in the second network information may be a particular value indicating at least one piece of network environment information included in the multiple pieces of previously-received network environment information described above as an example.

Finally, in operation 705, when the difference is greater than or equal to the threshold, the electronic device transmits a first signal to adjust a parameter of an antenna. In this case, examples of the parameter of the antenna of the base station may include at least one of a tilt of the antenna, a direction thereof, a height thereof, and a gain thereof. For example, a tilt value of the antenna may be adjusted by the electronic device.

Figure 8:
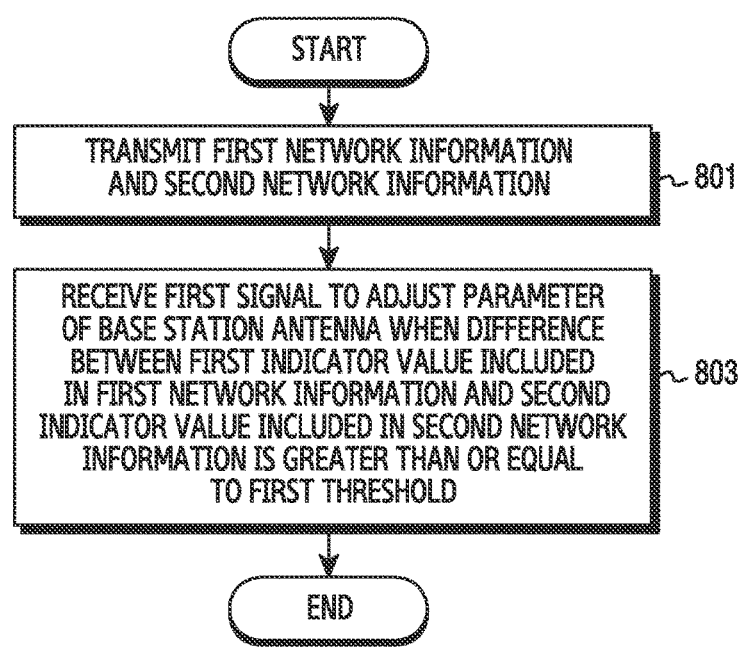
FIG. 8 is a flowchart illustrating an operating method of a base station in a wireless communication system according to an embodiment of the present disclosure.

FIG. 8 is a flowchart illustrating an operating method of a base station in a wireless communication system according to an embodiment of the present disclosure.

Referring to FIG. 8, first, in operation 801, the base station transmits first network information and second network information to the electronic device according to an embodiment of the present disclosure. In this case, each of the first network information and the second network information may include UE-based network information and base station-based network information. The UE-based network information may include at least one piece of information among information included in a measurement report of a UE, such as RSRP or RSRQ, and uplink SRS power information. The base station-based network information may include at least one piece of information among RRC connection-related information, call drop-related information, and information on a relation between cells.

In operation 803, when a difference between a first indicator value included in the first network information and a second indicator value included in the second network information is greater than or equal to a first threshold, the base station receives, from the electronic device, a first signal to adjust a parameter of an antenna of the base station.

In this case, the first indicator value included in the first network information may be a particular value indicating at least one piece of network information included in the first network information described above as an example. Also, the network information may be set to be periodically received from the base station. Thus, second network information may also separately exist which is received from the base station at a time point (hereinafter referred to as a "previous time point") preceding a time point of determining the first indicator value by a time period corresponding to a particular predetermined cycle. Herein, the second indicator value included in the second network information may be a particular value indicating at least one piece of network environment information included in the multiple pieces of previously-received network environment information described above as an example.

Also, examples of the parameter of the antenna of the base station may include at least one of a tilt of the antenna, a direction thereof, a height thereof, and a gain thereof.

In the wireless communication system, a parameter of the antenna is optimized on the basis of real-time RF environment information, and thereby a communication network may be optimized in the entire service area without a separate device. As a result, the performance and efficiency of the wireless communication system may be improved.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus of an electronic device in a wireless communication system, the apparatus comprising:
at least one processor; and
at least one transceiver operatively coupled to the at least one processor,
wherein the at least one transceiver is configured to:
  receive, from a base station, first information comprising a first indicator for a wireless environment of the base station in a first time,
  receive, from the base station, second information comprising a second indicator for the wireless environment of the base station in a second time, and
  transmit, to the base station, a first signal for adjusting a parameter of an antenna when a difference between the first indicator and the second indicator is greater than or equal to a first threshold,
wherein each of the first information and the second information comprises at least one of radio resource control (RRC) connection information and call drop information measured by the base station,
wherein the RRC connection information indicates a number of user equipments (UEs) connected to the base station, among a plurality of UEs attempting to connect the base station,
wherein the call drop information indicates a number of UEs in which call drops occur, among a plurality of UEs connected to the base station, and
wherein the parameter of the antenna comprises a tilt of the antenna.

2. The apparatus of claim 1,
wherein the second time is a time point after a predetermined cycle from the first time, and
wherein the antenna is an antenna of the base station.

3. The apparatus of claim 1,
wherein the tilt of the antenna is adjusted by changing a phase of an element included in the antenna.

4. The apparatus of claim 1,
wherein the at least one processor is further configured to, if a difference between the first indicator and a third indicator is less than a second threshold, transmit a second signal for re-adjusting the parameter of the antenna, and wherein the third indicator is included in third information received after the first signal is transmitted.

5. The apparatus of claim 1, wherein the tilt of the antenna is adjusted by changing a physical position of the antenna.

6. The apparatus of claim 1, wherein the parameter of the antenna comprises a parameter for adjusting a phase and a strength of a signal radiated from the antenna for beamforming.

7. An apparatus of a base station in a wireless communication system, the apparatus comprising:
at least one processor; and
at least one transceiver configured to:
transmit, to an electronic device, first information comprising a first indicator for a wireless environment of the base station in a first time,
transmit, to the electronic device, second information comprising a second indicator for the wireless environment of the base station in a second time, and
receive, from the electronic device, a first signal for adjusting a parameter of an antenna, the parameter comprising a tilt of the antenna,
wherein each of the first information and the second information comprises at least one of radio resource control (RRC) connection information and call drop information measured by the base station,
wherein the RRC connection information indicates a number of user equipments (UEs) connected to the base station, among a plurality of UEs attempting to connect the base station,
wherein the call drop information indicates a number of UEs in which call drops occur, among a plurality of UEs connected to the base station, and
wherein the first signal is transmitted when a difference between the first indicator and the second indicator is greater than or equal to a first threshold.

8. The apparatus of claim 7,
wherein the antenna is configured to transmit a signal, and
wherein the at least one processor is further configured to adjust the parameter of the antenna by changing a phase of an element included in the antenna.

9. A method for operating an electronic device in a wireless communication system, the method comprising:
receiving, from a base station, first information comprising a first indicator for a wireless environment of the base station in a first time;
receiving, from the base station, second information comprising a second indicator for the wireless environment of the base station in a second time; and
transmitting, to the base station, a first signal for adjusting a parameter of an antenna when a difference between the first indicator and the second indicator is greater than or equal to a first threshold,
wherein each of the first information and the second information comprises at least one of radio resource control (RRC) connection information and call drop information measured by the base station,
wherein the RRC connection information indicates a number of user equipments (UEs) connected to the base station, among a plurality of UEs attempting to connect the base station,
wherein the call drop information indicates a number of UEs in which call drops occur, among a plurality of UEs connected to the base station, and
wherein the parameter of the antenna comprises a tilt of the antenna.

10. The method of claim 9,
wherein the second time is a time point after a predetermined cycle from the first time, and
wherein the antenna is an antenna of the base station.

11. The method of claim 9, wherein the tilt of the antenna is adjusted by changing a phase of an element included in the antenna.

12. The method of claim 9, further comprising:
if a difference between the first indicator and a third indicator is less than a second threshold, transmitting a second signal for re-adjusting the parameter of the antenna,
wherein the third indicator is included in third information received after the first signal is transmitted.

13. The method of claim 9, wherein the tilt of the antenna is adjusted by changing a physical position of the antenna.

14. The method of claim 9, wherein the parameter of the antenna comprises a parameter for adjusting a phase and a strength of a signal radiated from the antenna for beamforming.

15. A method for operating a base station in a wireless communication system, the method comprising:
transmitting, to an electronic device, first information comprising a first indicator for a wireless environment of the base station in a first time;
transmitting, to the electronic device, second information comprising a second indicator for the wireless environment of the base station in a second time; and
receiving, from the electronic device, a first signal for adjusting a parameter of an antenna, the parameter comprising a tilt of the antenna,
wherein each of the first information and the second information comprises at least one of radio resource control (RRC) connection information and call drop information measured by the base station,
wherein the RRC connection information indicates a number of user equipments (UEs) connected to the base station, among a plurality of UEs attempting to connect the base station,
wherein the call drop information indicates a number of UEs in which call drops occur, among a plurality of UEs connected to the base station, and
wherein the first signal is transmitted when a difference between the first indicator and the second indicator is greater than or equal to a first threshold.

16. A non-transitory computer-readable storage medium storing instructions that, when executed, cause at least one processor to perform the method of claim 15.

17. The method of claim 15, further comprising:
adjusting the parameter of the antenna by changing a phase of an element included in the antenna.

* * * * *